(12) United States Patent
Melnik

(10) Patent No.: US 12,444,103 B2
(45) Date of Patent: Oct. 14, 2025

(54) SYSTEM, METHOD, AND APPARATUS FOR MACHINE LEARNING-BASED MAP GENERATION

(71) Applicant: HERE Global B.V., Eindhoven (NL)

(72) Inventor: Ofer Melnik, Weehawken, NJ (US)

(73) Assignee: HERE Global B.V., Eindhoven (NL)

( * ) Notice: Subject to any disclaimer, the term of this patent is extended or adjusted under 35 U.S.C. 154(b) by 554 days.

(21) Appl. No.: 17/964,670

(22) Filed: Oct. 12, 2022

(65) Prior Publication Data

US 2024/0127504 A1    Apr. 18, 2024

(51) Int. Cl.
*G06T 11/20*    (2006.01)
*G06T 3/4046*   (2024.01)

(52) U.S. Cl.
CPC .......... *G06T 11/206* (2013.01); *G06T 3/4046* (2013.01)

(58) Field of Classification Search
CPC ............................ G06T 11/206; G06T 3/4046
See application file for complete search history.

(56) References Cited

U.S. PATENT DOCUMENTS

| | | |
|---|---|---|
| 2020/0041276 A1 | 2/2020 | Chakravarty et al. |
| 2020/0111238 A1* | 4/2020 | Covell ................. G06N 3/08 |
| 2021/0319046 A1* | 10/2021 | Bandyopadhyay .... G06N 3/044 |
| 2021/0377566 A1 | 12/2021 | Iguchi et al. |
| 2022/0012579 A1* | 1/2022 | Asama ................. G06N 3/045 |
| 2022/0101639 A1 | 3/2022 | Shugurov et al. |
| 2022/0196415 A1* | 6/2022 | Sameer ............. G01C 21/3461 |
| 2022/0357176 A1* | 11/2022 | Yin .................... G01C 21/3841 |
| 2023/0304826 A1* | 9/2023 | Zhang ................... G06N 3/047 |

FOREIGN PATENT DOCUMENTS

CN    114445630 A    5/2022

OTHER PUBLICATIONS

K. Bruhwiler, P. Khandelwal, D. Rammer, S. Armstrong, S. L. Pallickara and S. Pallickara, "Lightweight, Embeddings Based Storage and Model Construction Over Satellite Data Collections," 2020 IEEE International Conference on Big Data (Big Data), Atlanta, GA, USA, 2020 (Year: 2020).*

Minnen, David, et al. "Spatially Adaptive Image Compression Using a Tiled Deep Network." arXiv.Org, Feb. 7, 2018, arxiv.org/abs/1802.02629 (Year: 2018).*

(Continued)

*Primary Examiner* — Vu Le
*Assistant Examiner* — Jacob Tyler Collogan
(74) *Attorney, Agent, or Firm* — DITTHAVONG, STEINER & MLOTKOWSKI

(57) ABSTRACT

An approach is provided for machine learning-based map generation. The approach involves, for example, receiving an encoder output for an image depicting a geographic area, wherein the encoder output comprises an encoding for each tile of a plurality of tiles of the image, and wherein the encoding represents data associated with a location of each tile. The approach also involves using a machine learning decoder to determine a window over the encoder output comprising a tile of the plurality of tiles and one or more neighboring tiles and to process the encoding associated with the tile and the one or more neighboring tiles in the window to generate a map representation for the location of the tile and providing the map representation as an output.

20 Claims, 15 Drawing Sheets

(56) References Cited

OTHER PUBLICATIONS

Mattheuwsen, Lukas, and Maarten Vergauwen. "Manhole Cover Detection on Rasterized Mobile Mapping Point Cloud Data Using Transfer Learned Fully Convolutional Neural Networks." MDPI, Multidisciplinary Digital Publishing Institute, Nov. 20, 2020, www.mdpi.com/2072-4292/12/22/3820 (Year: 2020).*
Lee, J. "A Combinatorial Data Model for Representing Topological Relations among 3D Geographical Features in micro-Spatial Environments: International Journal of Geographical Information Science: vol. 19, No. 10." Tandfonline, 2007, www.tandfonline.com/doi/abs/10.1080/13658810500399043 (Year: 2007).*
Lee et. al (Year: 2007).*
Bruhwiler et. al (Year: 2020).*
Mattheuwsen et. al (Year: 2020).*
Minnen et. al (Year: 2018).*
Mukherjee et al., "Predicting vehicle behaviour using automotive radar and recurrent neural networks", 2021, pp. 1-14.
Carlier et al., "DeepSVG: A Hierarchical Generative", Generative Network for Vector Graphics Animation, 2020, 19 pages.
Jadon, "A survey of loss functions for semantic segmentation", 2020, 2020 IEEE Conference on Computational Intelligence in Bioinformatics and Computational Biology (CIBCB), 6 pages.
Li et al., "Differentiable vector graphics rasterization for editing and learning", ACM Transactions on Graphics, vol. 39, Issue 6, Dec. 2020 Article No. 193, 15 pages.
Lopes et al., "A Learned Representation for Scalable Vector Graphics", Apr. 4, 2019, pp. 1-13.
Nash et al., "PolyGen: An Autoregressive Generative Model of 3D Meshes", 2020, 10 pages.
Reddy et al., "Im2Vec: Synthesizing Vector Graphics without Vector Supervision", Apr. 1, 2021, 10 pages.

* cited by examiner

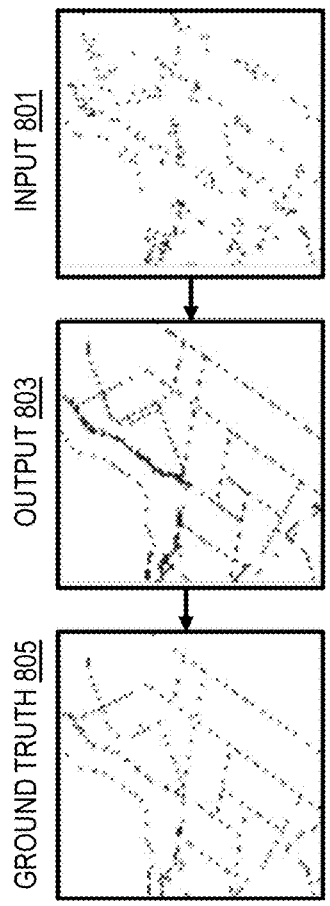
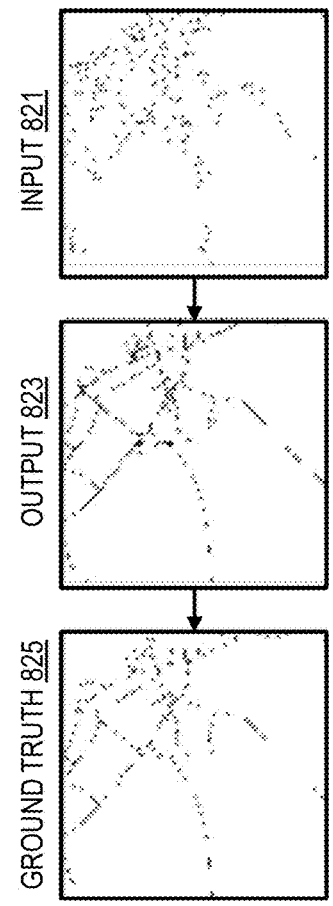
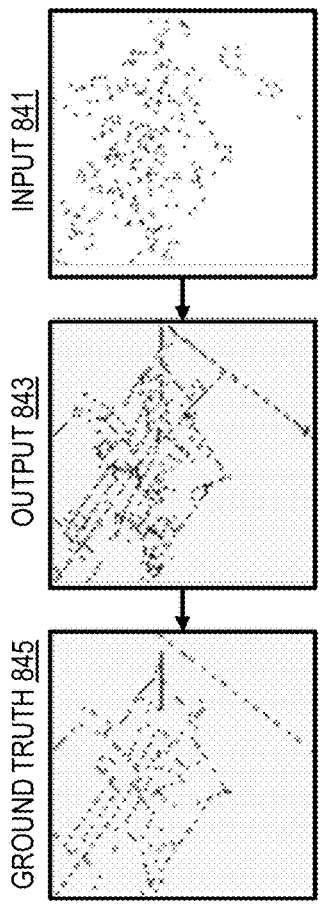
FIG. 8A
FIG. 8B
FIG. 8C

SYSTEM, METHOD, AND APPARATUS FOR MACHINE LEARNING-BASED MAP GENERATION

BACKGROUND

Mapping and navigation service providers are making increasing use of machine learning to provide location-based services. Machine learning, for instance, enables service providers to extract underlying spatial and/or semantic relationships between locations from images (e.g., to generate digital maps from imagery). However, developing and training machine learning models to understand and extract these spatial/semantic relationships present significant technical challenges.

SOME EXAMPLE EMBODIMENTS

Therefore, there is a need for approaches to provide machine learning-based map generation.

According to one embodiment, a method comprises receiving an encoder output for an image depicting a geographic area. The encoder output, for instance, comprises an encoding for each tile of a plurality of tiles of the image, and the encoding represents data associated with a location of each tile. The method also comprises using a machine learning decoder to determine a window over the encoder output comprising a tile of the plurality of tiles and one or more neighboring tiles and to process the encoding associated with the tile and the one or more neighboring tiles in the window to generate a map representation for the location of the tile. The method further comprises providing the map representation as an output. In one embodiment, the method further comprises using the machine learning decoder to move the window to another tile of the plurality of tiles such that the moved window is over the another tile and one or more other neighboring tiles and to process the encoding associated with the another tile and the one or more other neighboring tiles in the moved window to generate another map representation for the another tile (e.g., until all tiles of the image are processed).

According to another embodiment, an apparatus comprises at least one processor, and at least one memory including computer program code for one or more computer programs, the at least one memory and the computer program code configured to, with the at least one processor, cause, at least in part, the apparatus to receive an encoder output for an image depicting a geographic area. The encoder output, for instance, comprises an encoding for each tile of a plurality of tiles of the image, and the encoding represents data associated with a location of each tile. The apparatus is also caused to use machine learning decoder to determine a window over the encoder output comprising a tile of the plurality of tiles and one or more neighboring tiles and to process the encoding associated with the tile and the one or more neighboring tiles in the window to generate a map representation for the location of the tile. The apparatus is further caused to provide the map representation as an output. In one embodiment, the apparatus is further caused to use the machine learning decoder to move the window to another tile of the plurality of tiles such that the moved window is over the another tile and one or more other neighboring tiles and to process the encoding associated with the another tile and the one or more other neighboring tiles in the moved window to generate another map representation for the another tile (e.g., until all tiles of the image are processed).

According to another embodiment, a non-transitory computer-readable storage medium carries one or more sequences of one or more instructions which, when executed by one or more processors, cause, at least in part, an apparatus to receive an encoder output for an image depicting a geographic area. The encoder output, for instance, comprises an encoding for each tile of a plurality of tiles of the image, and the encoding represents data associated with a location of each tile. The apparatus is also caused to use a machine learning decoder to determine a window over the encoder output comprising a tile of the plurality of tiles and one or more neighboring tiles and to process the encoding associated with the tile and the one or more neighboring tiles in the window to generate a map representation for the location of the tile. The apparatus is further caused to provide the map representation as an output. In one embodiment, the apparatus is further caused to use the machine learning decoder to move the window to another tile of the plurality of tiles such that the moved window is over the another tile and one or more other neighboring tiles and to process the encoding associated with the another tile and the one or more other neighboring tiles in the moved window to generate another map representation for the another tile (e.g., until all tiles of the image are processed).

According to another embodiment, an apparatus comprises means for receiving an encoder output for an image depicting a geographic area. The encoder output, for instance, comprises an encoding for each tile of a plurality of tiles of the image, and the encoding represents data associated with a location of each tile. The apparatus also comprises means for using the machine learning decoder to determine a window over the encoder output comprising a tile of the plurality of tiles and one or more neighboring tiles and to process the encoding associated with the tile and the one or more neighboring tiles in the window to generate a map representation for the location of the tile. The apparatus further comprises means for providing the map representation as an output. In one embodiment, the apparatus further comprises means for using the machine learning decoder to move the window to another tile of the plurality of tiles such that the moved window is over the another tile and one or more other neighboring tiles and to process the encoding associated with the another tile and the one or more other neighboring tiles in the moved window to generate another map representation for the another tile (e.g., until all tiles of the image are processed).

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A-8C are diagrams illustrating example map representation outputs, according to one example embodiment;

DESCRIPTION OF SOME EMBODIMENTS

Examples of a system, method, apparatus, and computer program for machine learning (ML)-based map generation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
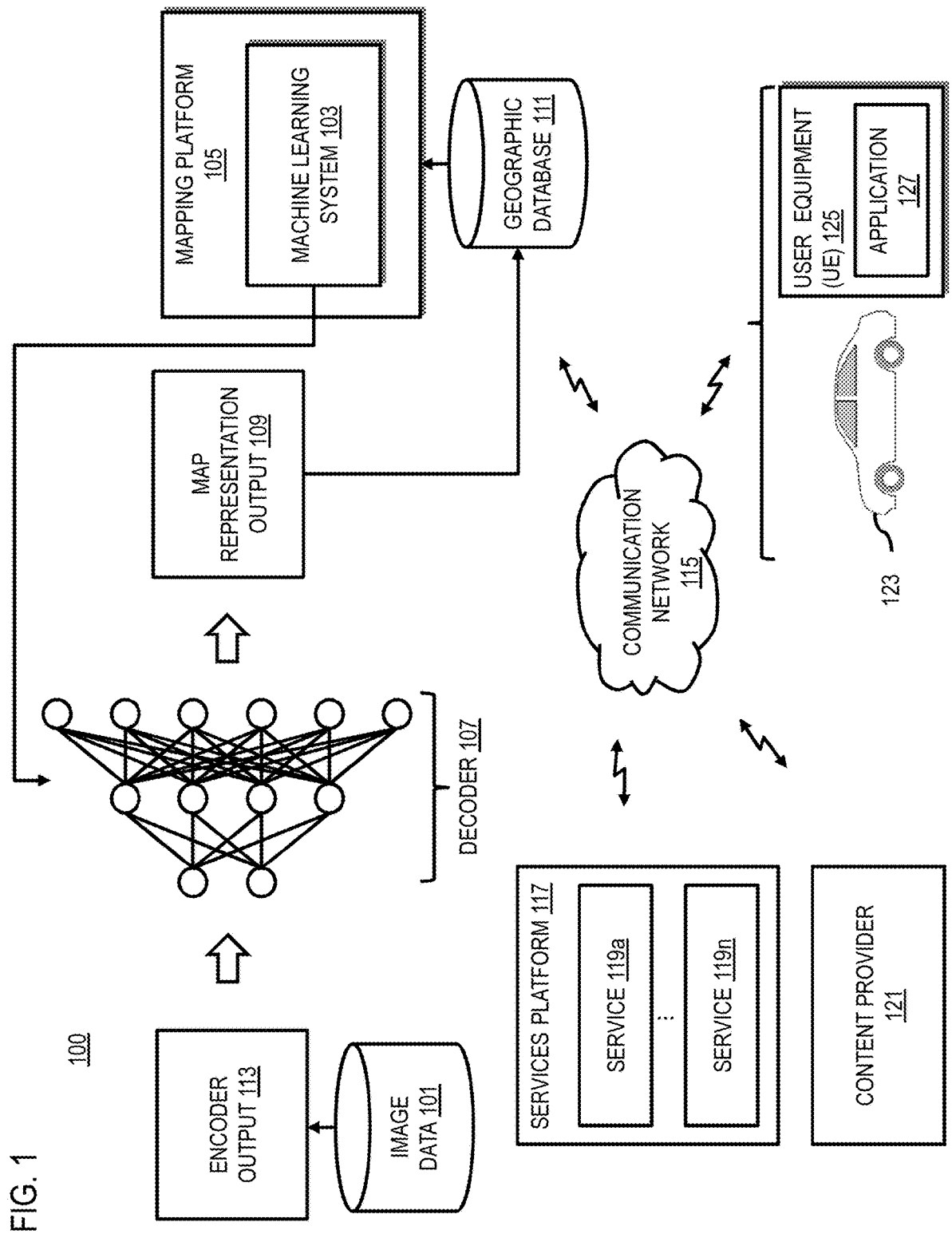
FIG. 1 is a diagram of a system capable of machine learning-based map generation, according to one example embodiment.

FIG. 1 is a diagram of a system 100 capable of machine learning-based map generation, according to one example embodiment. There are many different technical challenges in using machine learning (ML) for map generation. As used herein, the term "map generation" refers to automatically generating a digital map representation of a geographic area (e.g., road network, road signs, buildings, and/or any other cartographic features) from raw data (e.g., image data 101 or equivalent sensor data depicting geographic areas that are to be mapped). For example, on the data front, some example technical challenges include but are not limited to overcoming issues such as: (1) noisy and biased raw data; (2) data that spans different modalities and comes from different sources; (3) highly skewed data distributions, with certain places highly represented and others with starkly sparse data; and (4) spartan, less-than-perfect ground truth data.

While contending with this plethora of challenges is tricky, generating a consistent and useful map presents its own technical challenges. For example, the map at a low level consists of simple geometric entities, and conceivably all an ML system needs to do is generate those geometric entities. However, these entities generally are all connected, e.g., roads lines are continuous, intersections tend to be symmetric, lanes are parallel, and/or other similar scenarios. Also, a map consists of layers of information that are interrelated and requires a holistic generation process. Treating the map as just an aggregation of low-level geometric features without these considerations can lead to many problems such as bad alignment or inconsistent outputs.

Considering at least the issues presented above, automated map making is clearly a technically difficult problem. To address these technical challenges, the system 100 of FIG. 1 introduces an approach to map generation based on an ML system 103 (e.g., incorporated in or otherwise associated with a mapping platform 105) that uses an ML-based decoder 107 to generate a map representation output 109 (e.g., a raster map and/or vector map for storage in a geographic database 111) from an encoder output 113. In one embodiment, the encoder output 113 is generated by processing image data 101 using any encoding means such as but not limited to a ML encoder or any other process for that can encode features for generating the map representation output 109.

Figure 2:
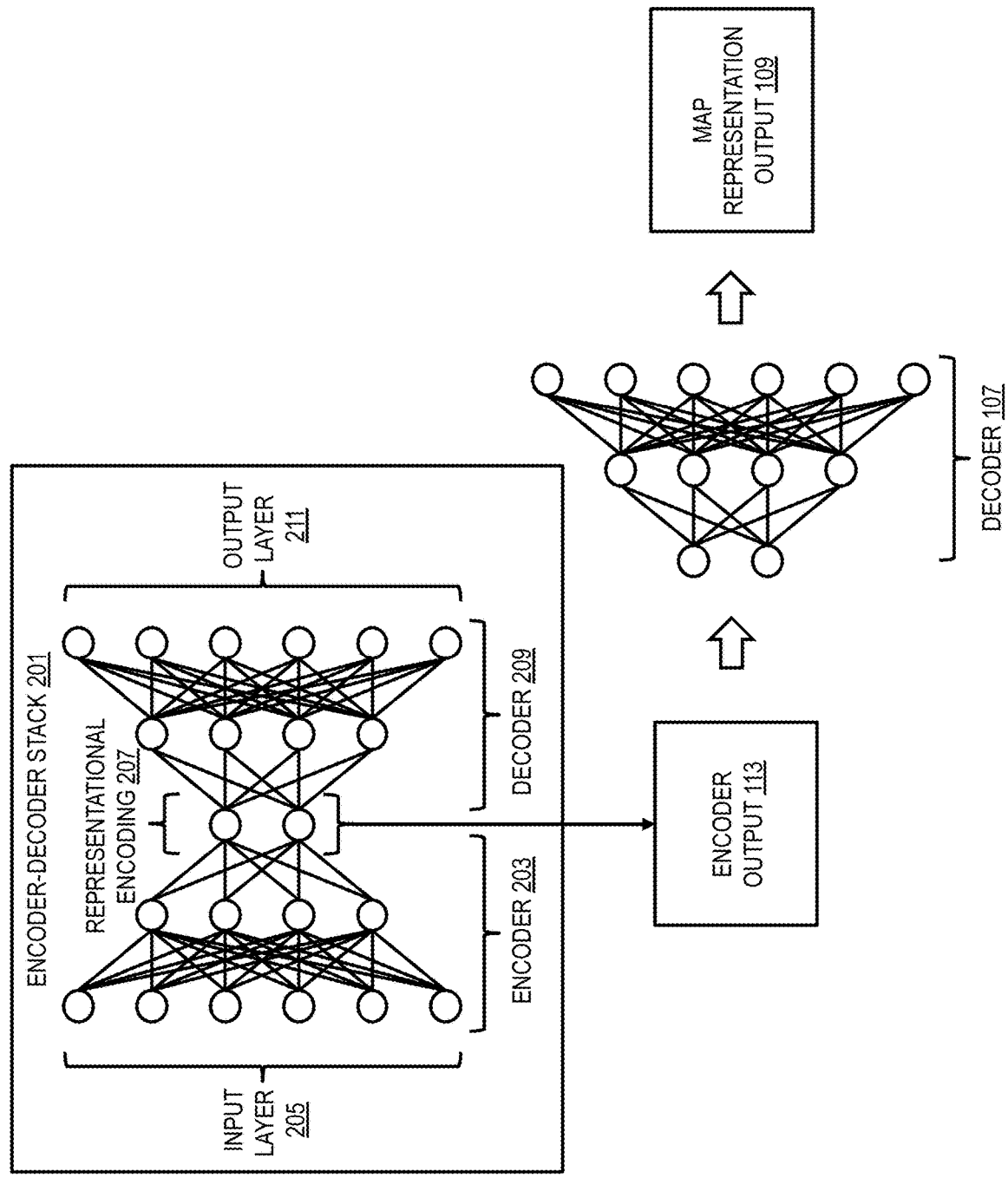
FIG. 2 is a diagram illustrating an encoder-decoder stack that can be used for machine learning-based map generation, according to one example embodiment.

In other words, the various embodiments of the system 100 break the problem of automated map generation down into two separate pieces: (1) processing raw inputs (e.g., image data 101 or equivalent) into semantically useful information (e.g., encoder output 113), and (2) turning that information (e.g., encoder output 113) into a map (e.g., map representation output 109). In one embodiment, a high-level ML pattern that is ubiquitous for making that separation is an encoder-decoder stack. FIG. 2 is a diagram illustrating an encoder-decoder stack 201 that can be used for machine learning-based map generation, according to one example embodiment. As shown in FIG. 2, in this pattern (e.g., encoder-decoder stack 201), the encoder 203 takes various inputs (e.g., image data 101 via input layer 205) and generates a representational encoding 207 of that data (e.g., which can be used as the encoder output 113), an encoding that is useful for how the data is to be used (e.g., useful for encoding features to generate a map). The decoder 209 of the encoder-decoder stack 201 in turn takes an encoding (e.g., representational encoding 207) and renders the desired output (e.g., output layer 211).

In one embodiment, the encoder-decoder stack 201 is a feed forward neural network that maps the input layer 205 to the output layer 211 by dimensionality reduction through an information bottleneck formed at the hidden layer corresponding to the representational encoding 207. This hidden layer typically delineates the boundary between the encoder 203 and decoder 209 of the encoder-decoder stack 201. The encoder 203, for instance, has hidden layers with decreasing numbers of nodes down to the minimum number of nodes at the representational encoding layer 207, and the decoder 209 has the opposite architecture with hidden layers of increasing numbers of nodes up to the maximum at the output layer 211. The information bottleneck or dimensionality reduction at the representational encoding layer 207 forces the encoder-decoder stack 201 to select only the most salient features of the raw data (e.g., image data 101) from which the map representation output 109 can be generated (e.g., by the decoder). The dimensionality reduction can be configured to balance between, for instance, removal of non-salient features (e.g., de-noisification) versus accuracy of map generation.

This dichotomy between the encoder 203 and decoder 209 of the encoder-decoder stack 201 enables the system 100 to focus on different elements with some independence. For example, the decoder 107 (e.g., used to generate map representation output 109) can be either the same or different than the decoder 209 of the encoder-decoder stack 201 of the encoder 203 used to generate the representational encoding 207. In this way, in one embodiment, the system 100 can focus on building the decoder 107 by utilizing a simple encoder and treating the problem as one of manifesting a decoder with good map properties (e.g., alignment of road or other map features between tiles or grid cells and consistent representation of the same cartographic features).

In addition or alternatively, given a decoder 107, the system 100 can build different encoders that work on different modalities of data (e.g., associated with different layers of cartographic features such as but not limited to road networks, road signs/furniture, points of interest, traffic, etc.) or even ones that combine them. For example, the decoder 107 can be trained in conjunction with a first encoder that works on raster images to generate maps. The decoder 107 is then "frozen" so that the decoder 107's weights and biases values are prevented from further changes. Then, if the system 100 wants to build a map from data modalities (e.g., GPS probe data, satellite imagery, street level imagery, etc.) other than modality on which the decoder 107 was originally trained (e.g., raster images), the system 100 need only build a specific encoder for each data type. In one embodiment, the process for building data specific encoders comprises freezing the weights and biases of the trained decoder 107 and pairing the decoder 107 with a new encoder to train. During training, the weights and biases of the trained decoder 107 remain frozen while the weights and biases of the new encoder are allowed to change, thereby forcing the encoder to learn to generate the intermediate representation the previously trained decoder 107 needs to generate maps. In one embodiment, the process of freezing the trained decoder 107 and pairing it with new encoders also works in the probabilistic setting (e.g., as discussed in the various embodiments described herein). In other embodiments, the system 100 may combine information the system 100 gets from different sensors/data types and their respective encoders, different encoders for the same sensor/data type, across multiple data samples of the same location, or any combination thereof. With this procedure, the respective encoders (e.g., associated with different sensors/data types) generate comparable outputs (e.g., intermediate representations) that can be processed by the trained decoder 107 to generate map representation outputs 109.

In some embodiments, the encoders need not be ML-based, and instead the encoder output 113 (e.g., used as input to the decoder 107) can be procedurally generated (e.g., in virtual reality/gaming or equivalent use cases) or generated using any other non-ML means. In one embodiment, by making the encoder and decoder independent, if at some time in the future, the system 100 determines that the encoding representation needs refinement, the system 100 can still apply these individual learnings of various pieces by retraining.

In one embodiment, the various embodiments of automated map generation described herein emphasizes the decoding side of the encoder-decoder stack 201. The various embodiments described herein rely on multiple ideas. One such idea is invariance, finding the regularity in the data, the part that is invariant under transformation and using that to generalize. Another principle is bias versus variance. Data can be fit to an infinity of potential models. As such, in one embodiment, the system 100 constrains the potential models to a limited subset of that infinity, e.g., the subset that best fits the map generation domain. For example, the architecture used for the decoder 107 is based on finding a model that can capture the structure and regularity of maps. Such a model should implicitly represent the distribution of likely maps. As such, it will provide a filter through which the system 100's multimodal data can be interpreted and evaluated.

In one embodiment, the encoder-decoder stack 201 is built as a deep fully convolutional neural network. For example, the encoder 203 consisted of a not pretrained resnet34, without the final layers, just the convolutional ones. Following an information bottleneck, a latent representation layer (e.g., the representational encoding layer 207) is placed so that it squeezes the channels to a small amount, forcing information compression. The decoder 209 itself, for instance, is a sequence of convolutional layers with up sampling layers interspersed to get to the original image resolution used in the input layer 205 of the encoder 203 (or any other designated target resolution) and achieve channel compression. In one embodiment, the decoder 209 has no residual connections and is purely feedforward.

One part of the architecture is the lack of lateral connections between the encoder 203 and decoder 209 (e.g., unlike a UNet). Rather, the encoder output 113 is fed through a compression layer (e.g., latent representational encoding layer 207) and that is what is input to the decoder 209 or 107. This latent representation facilitates de-noisification of the raw input data and organizing it into an intermediate representation.

Another part of the architecture is the lack of residual connections in the decoder 209/107. Each layer outputs only to its next layer. This structure facilitates the decoder 209/107 learning map structures as a hierarchy of structural features.

Yet another part is the use of hierarchical convolution layers in both the encoder 203 and decoder 209/107. Using them enforces the idea of similarity between local squares on a map and the dependency on nearby squares.

In one embodiment, the network (e.g., encoder-decoder stack 201) is trained on example images of road maps. Each input, for instance, is modified from the original by adding various level of noise. By way of example, in one use case, the noise is in the form of pixel displacement.

Figure 3:
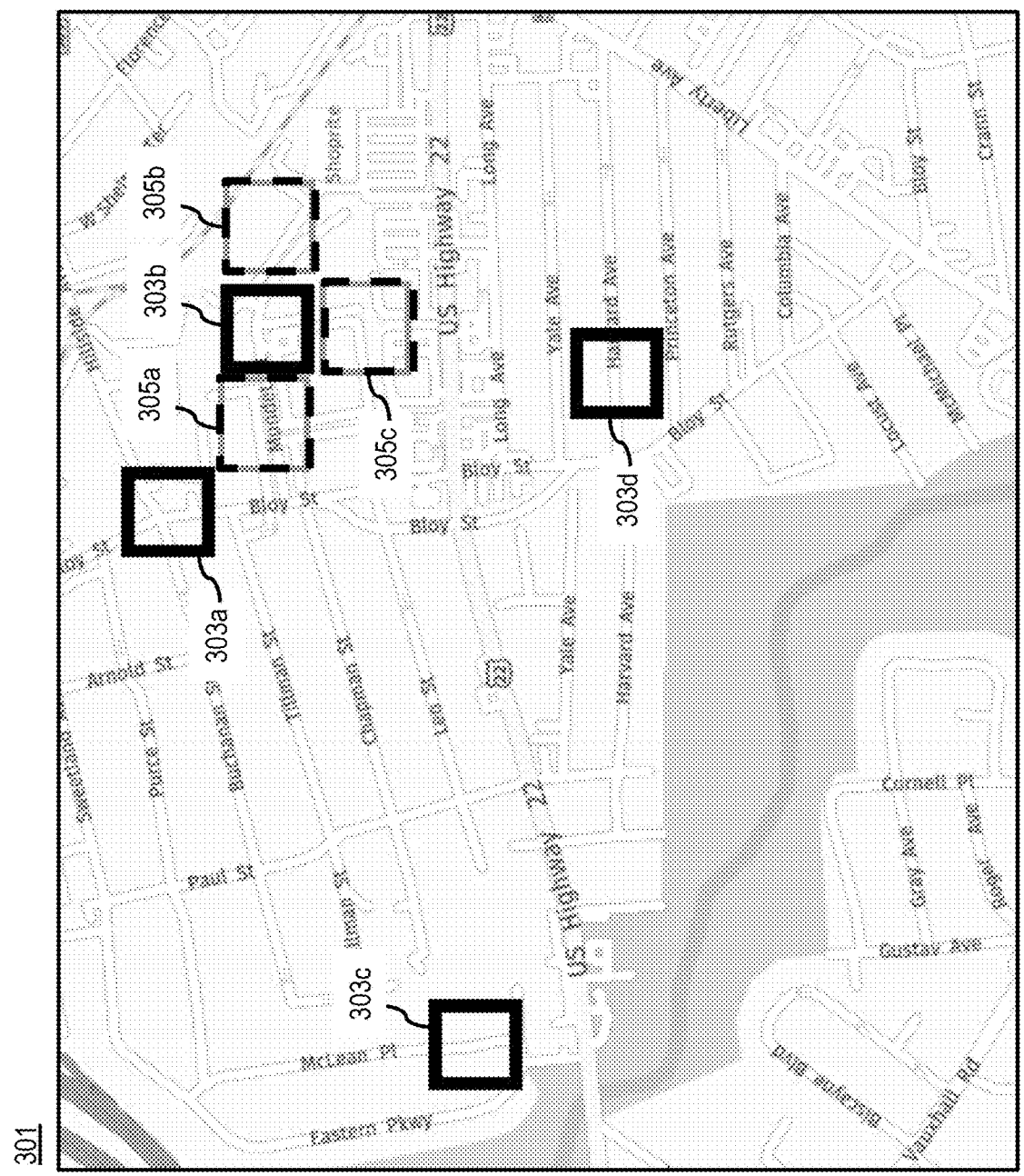
FIG. 3 is a diagram illustrating an example map with feature regularity, according to one example embodiment.

FIG. 3 is a diagram illustrating an example map 301 with feature regularity, according to one example embodiment. In this example, a map 301 of geographic area is shown. It is a typical map section for the area, combining urban, suburban, highway, and a park. Consider the areas demarcated by black squares 303a-303d. At that scale, maps seem to repeat themselves. In other words, there is a great deal of similarity between one such square and another (e.g., between square 303a and 303b, and between square 303c and 303d). This implies that the regularity of maps lies within capturing an implicit codebook of squares, and then building a map by aligning these squares together. As used herein, a "codebook" refers to different geometric arrangements of cartographic features observed or otherwise present at one or more selected scales. In that vein, notice the black square 303b surrounded by green squares 305a-305c. Here, another piece of map regularity is observed, the black square 303b is constrained by the squares 305a-305c around it, i.e., the roads in the squares typically continue into the squares adjoining them. There are other pieces of regularity in maps, such as symmetries between roads, but these two, a low-scale codebook and alignment between adjoining areas are provided as examples of such regularities.

In one embodiment, to integrate aspects of the above observations (e.g., map regularity and alignment between adjoining areas, the system 100 configures the decoder 107 to operate using a sliding window of the encoder output 113 (e.g., representational encoding of raw data) that encompasses an area (e.g., delineated by a tile, grid cell, or equivalent) and its neighboring areas when decoding the encoder output 113 to generate a map representation output 109. In other words, the decoder 107 determines the cartographic features encoded in the encoder output 113 for an area of interest along with the features of its neighboring areas and then generates a visual representation of those cartographic feature for the area of interest. The sliding window is moved to the next area (e.g., covering another area of interest along with its neighboring areas) to generate a map representation output 109 for that new area of interest. This process is then repeated until all or a designated portion of the areas (e.g., tiles, grid cells, etc.) in the encoder output 113 are processed to generate an overall map for those areas.

In one embodiment, the map representation output 109 generated from the encoder output 113 can be provided as an output and stored in the geographic database 111. It is contemplated that the map representation output 109 (or digital map data of the geographic database 111 derived therefrom) can be transmitted or otherwise accessed over a communication network 115 and used for any application, service, or tasks such as but not limited to those associated a services platform 117, one or more services 119a-119n (also collectively referred to as services 119) of the services platform 117, a content provider 121, and/or any other component of the system or with connectivity to the system. In addition or alternatively, the map representation output 109 (or digital map data of the geographic database 111 derived therefrom) can be transmitted or otherwise accessed by end user devices such as but not limited to vehicles 123 and/or user equipment (UE) devices 125 executing applications 127 (e.g., location-based applications or client applications of the mapping platform 105) that use such data.

The various embodiments of automated map generation using an ML approach is discussed in more detail with respects to the figures below.

Figure 4:
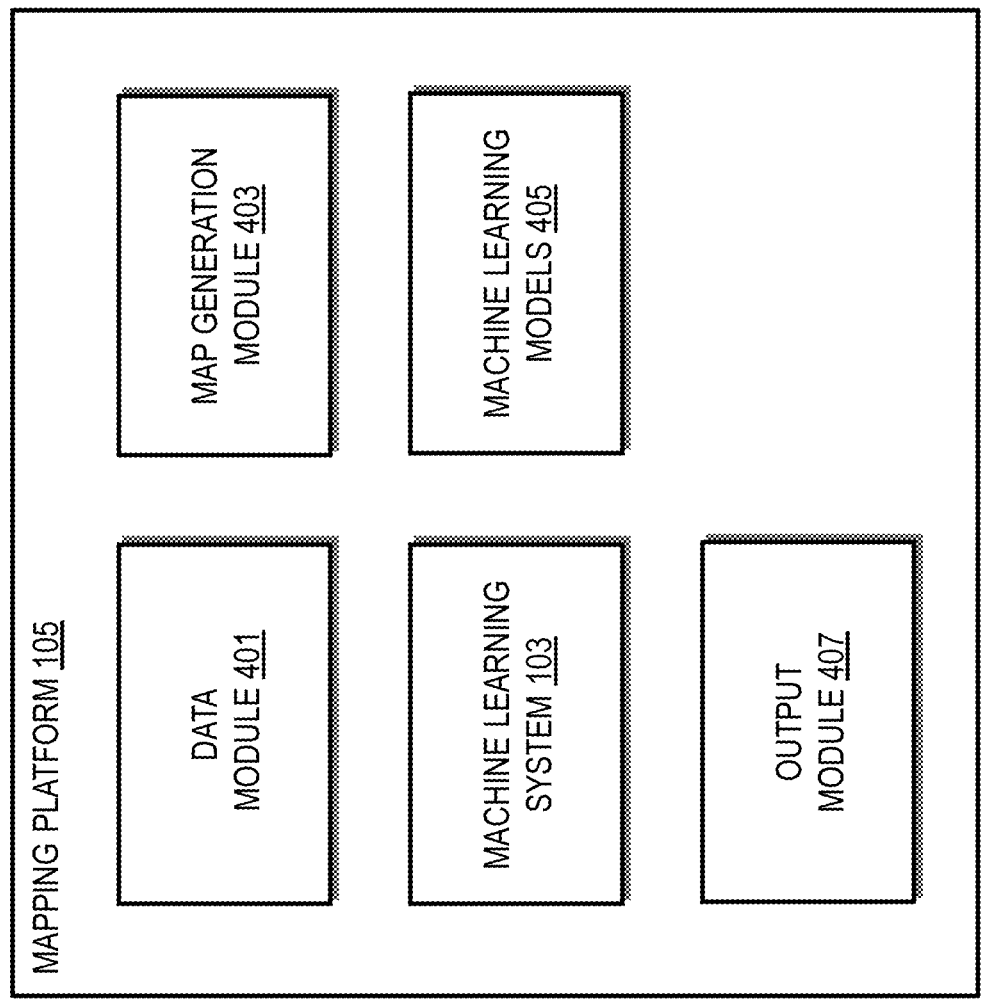
FIG. 4 is a diagram of components of a mapping platform capable of providing machine learning-based map generation, according to one example embodiment.

FIG. 4 is a diagram of components of a mapping platform capable of providing machine learning-based map generation, according to one example embodiment. In one embodiment, as shown in FIG. 4, the mapping platform 105 of the system includes one or more components for machine learning-based map generation according to the various embodiments described herein. It is contemplated that the functions of the components of the mapping platform 105 may be combined or performed by other components of equivalent functionality. As shown, in one embodiment, the mapping platform 105 includes a data module 401, a map generation module 403, the machine learning system 103, one or more machine learning models 405 (e.g., the decoder 107, one or more encoders 203, encoder-decoder stack 201, and/or any other model used according to the various embodiments described herein), and an output module 407. The above presented modules and components of the mapping platform 105 can be implemented in hardware, firmware, software, circuitry, or a combination thereof. Though depicted as a separate entity in FIG. 1, it is contemplated that the mapping platform 105 may be implemented as a module of any of the components of the system (e.g., services platform 117, services 119, content providers 121, vehicles 123, UEs 125, application 127, and/or the like). In another embodiment, one or more of the modules or components of the mapping platform 105 may be implemented as a cloud-based service, local service, native application, or combination thereof.

Figure 5:
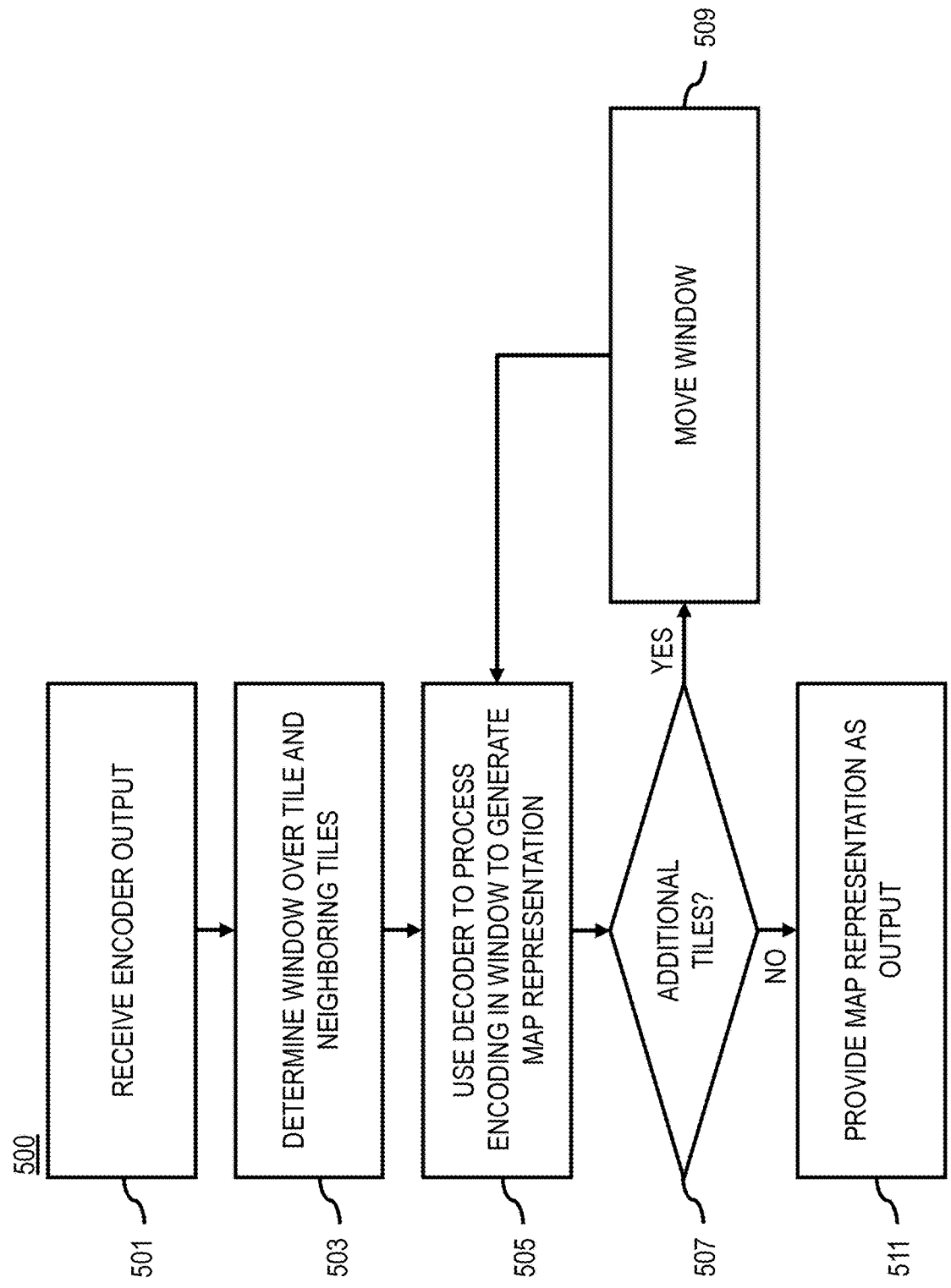
FIG. 5 is a flowchart of a process for machine-learning based map generation, according to one example embodiment.
Figure 14:
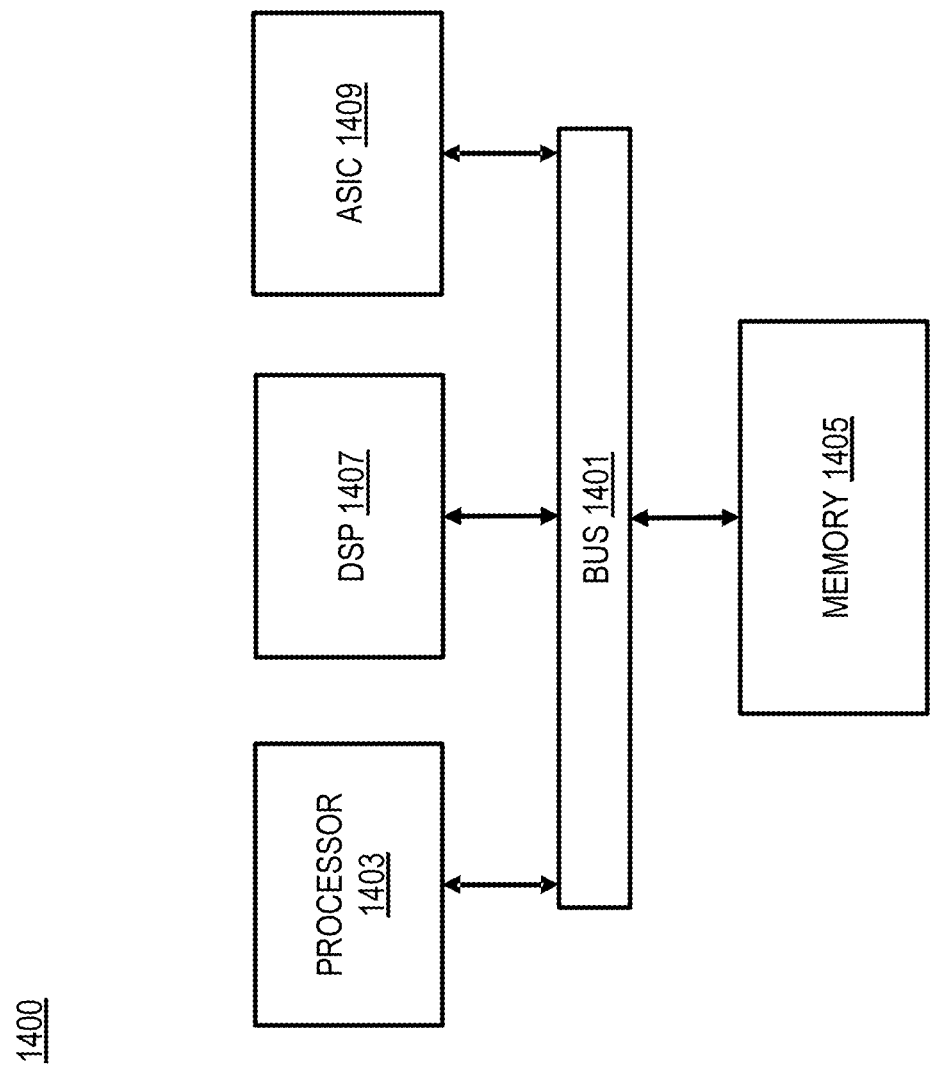
FIG. 14 is a diagram of a chip set that can be used to implement an example embodiment of the processes described herein.

FIG. 5 is a flowchart of a process 500 for machine-learning based map generation, according to one example embodiment. In various embodiments, the mapping platform 105 and/or any of its modules/components may perform one or more portions of the process 500 and may be implemented in, for instance, a chip set including a processor and a memory as shown in FIG. 14 or in circuitry. As such, the mapping platform 105 and/or any of its components/modules can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the data module 401 receives an encoder output 113 for an image (e.g., image data 101 including aerial imagery, street level imagery, map imagery, synthetically generated imagery, etc.) depicting a geographic area (e.g., real or virtual areas). By way of example, the encoder output 113 comprises an encoding for each tile of a plurality of tiles of the image. It is noted that although the various embodiments described herein are discussed with respect to tiles representing subdivisions of an image, it is contemplated that any other type or method for dividing or segmenting an image processing can be used. Examples of other types of subdivision or segmentation include but are not limited to squares, cells, hexagons, etc. comprising one or more groups of pixels. In one embodiment, the tiles can be based on a map tile representation of a geographic area or map where each tile corresponds to a designated geographic extent. The tiles can also be hierarchical and corresponding to different zoom levels wherein at tile a one level may comprise one or more groups of tiles at another level. The encoding (e.g., associated with a tile or geographic area) represents data associated with a location of each tile. The data, for instance, relate to cartographic features or any of features of the location that are to be mapped, and may be derived or otherwise extracted from image data 101 and/or any other equivalent sensor data (e.g., LiDAR, radar, etc.).

In one embodiment, the encoding can be generated directly (e.g., as unique feature vectors) based on the features associated with each location or tile. Alternatively, the encoding for each tile is based on an encoding codebook. As previously discussed, an encoding codebook may include an index of possible geometric entities or map configurations that regularly occur in a map and form basic building blocks for generating a map representation. In this way, a map can be generated by piecing together different combinations of the geometric entities to represent a given geographic area of interest.

In step 503, the map generation module 403 interacts with the machine learning system 103 to use the machine learning decoder 107 (or any other equivalent decoder from the machine learning models 405) to determine a window over the encoder output 113 comprising a tile of the plurality of tiles and one or more neighboring tiles.

In one embodiment, the machine learning system 103 can build and train the machine learning decoder 107 to generate feasible maps consistently (e.g., maps that match ground truth maps within a target level of accuracy or achieve targets levels of inter-tile alignment or consistency). In one embodiment, the machine learning system 103 treats the training process as a supervised image learning problem. However, it is contemplated that other learning algorithms can also be used including but not limited to unsupervised learning, reinforcement learning, semi-supervised, etc. By way of example, the outputs (e.g., map representation output 109) of the decoder 107 can be road-level raster maps at a fixed resolution. As inputs, the machine learning system 103 can get sampled and potentially noisy versions of road network imagery (or imager of any other cartographic features of interest including but not limited to road signs, road furniture, buildings, points of interest, etc.), which it learns to turn into maps.

In one embodiment, during training, multiple different loss functions and/or supervision schemes can be used alternatively or together to train the decoder 107, encoder 203, and/or any other network of the system 100 for map generation. One example scheme is based on supervised learning. For example, in supervised learning, the machine learning system 103 can incorporate a learning model (e.g., a logistic regression model, Random Forest model, and/or any equivalent model) to train the machine learning model 405 to generate map representation output 109 from encoder output 113. During training, the machine learning system 103 can feed feature sets from a training data set into the machine learning models 405 to compute a map representation or any other related characteristic using an initial set of model parameters. The machine learning system 103 then compares the predicted matching probability and the model output to ground truth data in the training data set for each training example (e.g., labeled map representations) used for training. The machine learning system 103 then computes an accuracy of the predictions (e.g., via a loss function) for the initial set of model parameters. If the accuracy or level of performance does not meet a threshold or configured level, the machine learning system 103 incrementally adjusts the model parameters until the machine learning model 405 generates predictions at a desired or configured level of accuracy with respect to the annotated labels in the training data (e.g., the ground truth data) through back propagation and gradient descent. In other words, a "trained" machine learning model 405 has model parameters adjusted to make accurate predictions (e.g., map representations) with respect to the training data set. In the case of a neural network, the model parameters can include, but are not limited, to the coefficients or weights and biases assigned to each connection between neurons in the layers of the neural network.

In step 505, the map generation module 403 interacts with the machine learning system 103 to use the machine learning decoder 107 (or any other equivalent decoder from the machine learning models 405) to process the encoding associated with the tile of interest and one or more neighboring tiles in the window to generate a map representation for the location of the tile.

Figure 6:
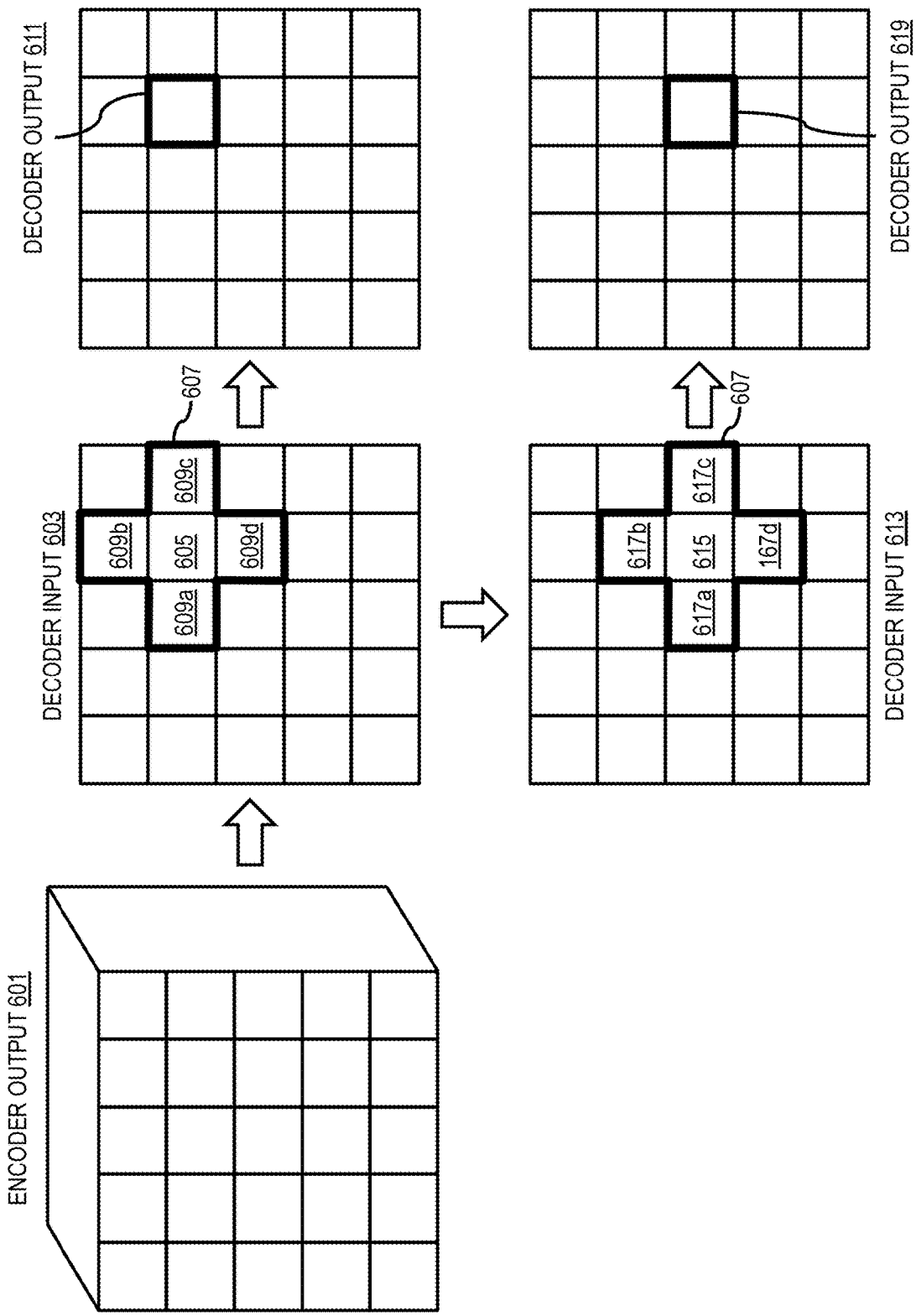
FIG. 6 is a diagram illustrating an operation of machine learning decoder for map generation, according to one example embodiment.

FIG. 6 is a diagram illustrating an operation of machine learning decoder 107 for map generation, according to one example embodiment. As described in step 501, an encoder (e.g., machine learning encoder 203) will generate an encoding for each tile (e.g., encoder output 601) from the input data (e.g., image data 101), where this encoding represents data associated with that location. The encoding, for instance, can be extracted from the representational encoding layer 207 of the encoder 203. In one embodiment, the decoder 107 can operate as a moving window across the encoding. For each tile, the decoder 107 can take the encoding for that tile as well as its neighboring tiles and output a raster of the map for that location (e.g., map representation output 109). As shown in the example of FIG. 6, the decoder input 603a for a given tile 605 places a window 607 centered on tile 605 and covering its neighboring tiles 609a-609d. It is noted that although the window 607 is illustrated as encompassing directly to the top, bottom, left, and right of the tile 605, it is contemplated that the window can span any number of neighboring tiles (not just immediate neighbors) including tiles on the diagonal or tiles separated by more than one tile. For example, in one embodiment, neighboring tiles can be determined based cartographic relationships to the tile (e.g., symmetries associated with highway interchanges, symmetries associated with entry and exit ramps on highways that may be separated by considerable distance, symmetries associated with parallel roads, etc.). In other words, in one embodiment, the one or more neighboring tiles are immediate neighbors to the tile. In addition or alternatively, the map generation module 403 can determine the one or more neighboring tiles based on one or more cartographic relationships to the tile.

In one embodiment, the decoder 107 uses the encoding data associated with the window 607 encompassing the tile 605 along with its neighboring tiles 609a-609d to generate a map representation for the tile 605 (e.g., decoder output 611). By using encoding data from the neighboring tiles 609a-609d, the decoder 107 can increase the probability of achieving better alignment of map representations for features that cross between tiles (e.g., roads). In addition, the machine learning decoder 107 can achieve a situation where given an arbitrary encoding the decoder outputs images of consistent maps and not anything else, in an input dependent manner. That is the decoder 107 can operate to generate map representations regardless of what encoder or process was used to generate the encoder output 113 from the raw input data (e.g., image data 101). The is because various embodiments of the architecture of the decoder 107 (e.g., described with respect to FIG. 2 above) explicitly capture map properties such as but not limited to codebook style repetition for low-level tiles and the impact of adjoining tiles on their neighbors.

Figure 7:
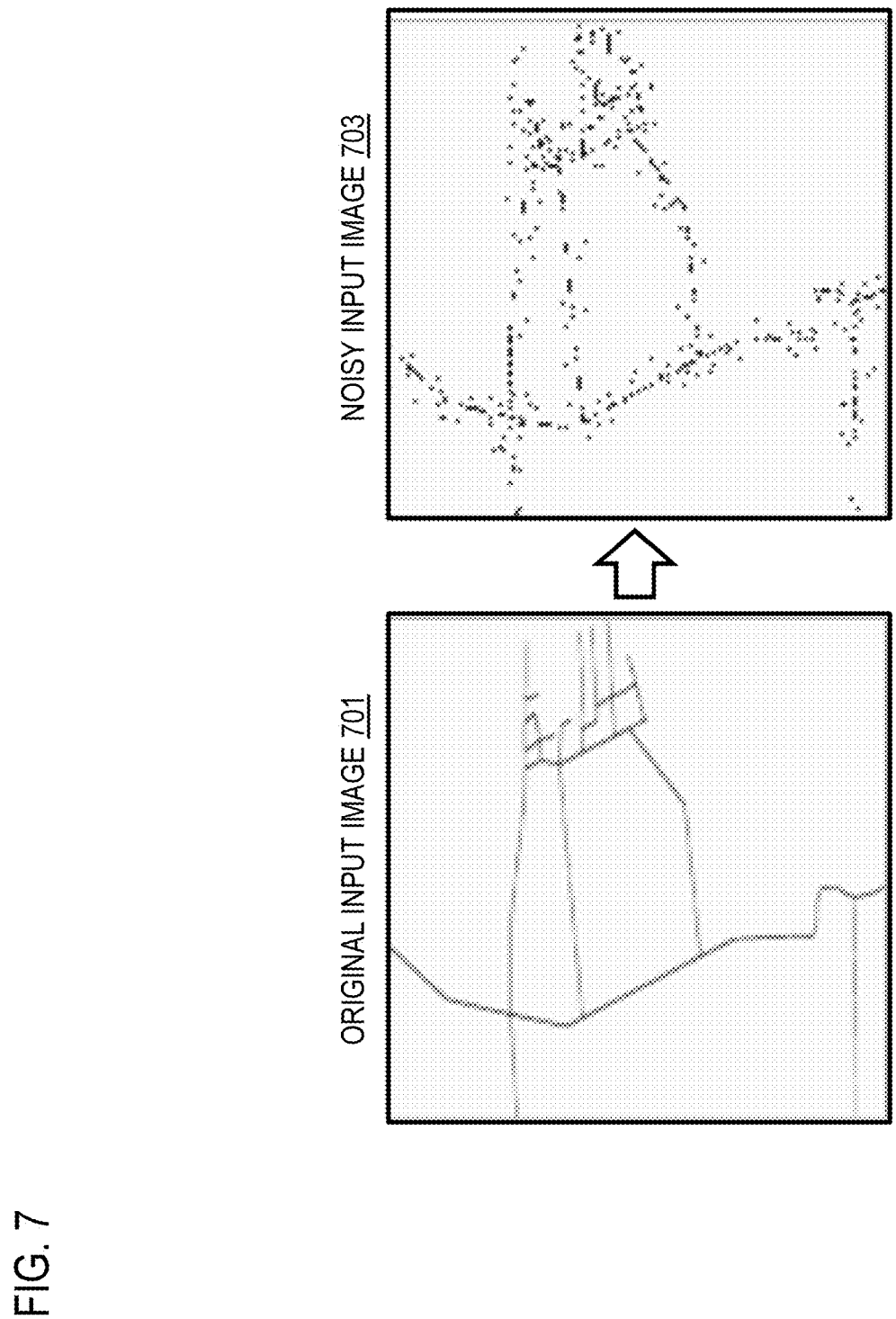
FIG. 7 is a diagram illustrating example original and noisy versions of training data, according to one example embodiment.

In one embodiment, the initial data to be used for training the decoder 107 can be images of map tiles of road networks (or any equivalent imagery). These image can be manipulated to generate noisy input data, utilizing various noise approaches. The combination of the road images coupled with noisy versions of them will be the labeled dataset for supervised training. FIG. 7 is a diagram illustrating example original and noisy versions of training data, according to one example embodiment. In this example, the sampled or original input image 701 depicts a road network that is to be turned into a map. A noisy input image 703 is generated from the original input image 703 using any means known to add noise to image. In one embodiment, the noisy input image 703 can be used to help learn a more generalizable encoding or representation of the image (e.g., by denoising through the information bottleneck of the encoder-decoder stack 201).

In one embodiment, the decoder 107 can be trained as part of an encoder-decoder stack 201. Then the decoder 107 can be extracted from the trained encoder-decoder stack 201. One example architecture for the encoder-decoder stack 201 and/or the decoder 107 includes a simpler direct architectures comprising, e.g., convolutional layers with up and down scaling. Other elements may be added to the architecture depending as the need arises (e.g., depending on data types, types of map outputs desired, complexity of cartographic features, etc.). The encoder may generate the codes directly or we may use a codebook style encoding.

As described above, for training, supervised loss functions may be used alone or in combination thereof with other types of learning algorithms (e.g., unsupervised learning, reinforcement learning, semi-supervised learning, etc.). The selection of the learning algorithm to use can be based on achieving better generalization or regularization. For example, the system 100 can select loss functions that emphasize the fine-grained quality.

In one embodiment, generative adversarial network (GAN) like elements could also be added to promote good generation properties in the decoder 107. For example, the decoder 107 can be trained based on a generator network to generate map representations and a discriminator network to evaluate the generated map representations to achieve improved map representations. The GAN like elements can also include but is not limited to use of diffusion networks or models that are based on a diffusion process that equates to a loss of information by gradually adding noise at every step of the diffusion process. For example, noise can be added to data (e.g., gradually adding pixel displacement, Gaussian noise, or equivalent) until the data is all noise in a forward direction for the network to learn how to reverse the noise. In this way, the diffusion process enables the network to learn the impact of noise on the information available from the input sample from which the decoder 107 can construct the map representation output 109.

As described above, the decoder 107 processes its input data using a sliding window across tiles of the encoder output 113 (e.g., similar to a convolutional kernel). After processing each tile, in step 507, the map generation module 403 determines whether there are additional tiles of the encoder output 113 to process. If there are additional tiles to process, at step 509, the map generation module 403 interacts with the machine learning system 103 to use the machine learning decoder 107 to move the window to another tile of the plurality of tiles. The moved window is then placed over the another tile and one or more other neighboring tiles (e.g., neighbors of the newly selected tile). Then, the process iteratively returns to step 505 to process the encoding associated with the another tile and the one or more other neighboring tiles in the moved window to generate another map representation for the another tile. In other words, the same decoder 107 replicates itself across locations (e.g., across tiles), generating the outputs. For example, returning the example of FIG. 6, in decoder input 613, the window 607 is moved be centered on tile 615 and its neighboring tiles 617a-617d. The encoding data associated with the tile 615 and its neighboring tiles 617a-617d is processed by the decoder 107 to generate decoder output 619 (e.g., a map representation for the location of tile 615).

If no additional tiles are left to process or any other designated stopping criterion is met, then the process 500 proceeds to step 507. In step 511, the output module 407 provides the map representation as an output. FIGS. 8A-8C are diagrams illustrating example map representation outputs, according to one example embodiment. In the example of FIG. 8A, an input image 801 (e.g., a noisy version of a raster map) is processed using the decoder 107 according to the various embodiments described herein to generate an output map representation 803 that matches closely to the ground truth image 805 depicting a same map area. Similarly, in the example of FIG. 8B, an input image 821 (e.g., a noisy version of a raster map) is processed using the decoder 107 according to the various embodiments described herein to generate an output map representation 823 that matches closely to the ground truth image 825 depicting a same map area. Again, the example of FIG. 8C, an input image 841 (e.g., a noisy version of a raster map) is processed using the decoder 107 according to the various embodiments described herein to generate an output map representation 843 that matches closely to the ground truth image 845 depicting a same map area. In one embodiment, the example output images 803, 823, and 843 can be provided as an output that can then be stored in the geographic database 111 and/or presented on a mapping user interface of an end user device (e.g., vehicle 123 and/or UE 125 via respective applications 127).

In one embodiment, the various embodiment automated map generation described herein relate to generating maps of road networks. However, maps are significantly more than road networks and represent layers of interconnected information (e.g., road signs, road furniture, buildings, terrain features, and/or other cartographic features). To provide for additional map layers, the system 100 introduces a capability to have concurrent independent encoder/decoder pairs for different types of information. In one embodiment, the system 100 can bridge connections from these different encoder-decoder pairs to create multiple map layers. In other embodiments, the system 100 can build a combined model of multiple encoder-decoder pairs that directly outputs multiple layers. In yet another embodiment, the system 100 can provide weaker or no coupling between encoder-decoder pairs for different information types so that the system 100 can model multiple layers while also enabling the development of new models for different data types that can then be easily integrated with existing models.

In one embodiment, the system 100 can provide for a multi-scale architecture of the decoder 107. For example, as described in some embodiments, the decoder 107 accesses adjacent tiles to estimate the map representation for the tile it is working on. In maps, much of the relevant information about a tile is in its immediate neighbors. However, there could scenarios with higher level information, whose access to, could enable the decoder 107 to provide more accurate or improved maps. For example, highway interchanges may have symmetry or constant curvature, city blocks may have regular structure, a city may have ring road structure, etc. In other words, different map regularities can appear at different scales of the map. In one embodiment, the system 100 can encode map regularities at different scales (e.g., scales corresponding to different map tile zoom levels) and furnished the multi-scale data to the decoder 107 to better capture such regularity.

In yet another embodiment, the system 100 can integrate probabilistic elements into the encoder/decoder model of the various embodiments described herein to account for uncertainty and combination with previous knowledge. For example, in one embodiment, the integration can be performed at the encoding level by including a probability over encodings per tile. This is a Bayesian take on probability, where the distribution specifies the amount of uncertainty the model has with respect to what the data may represent for a location of a tile. The system 100 can use, for instance, an encoding codebook, but rather than reporting the most likely embedding instead return the probabilities of the embeddings. Then, the decoder 107 can utilize the encoded probabilities of the embeddings as a weighted average over possible encodings. It is noted that the weighted average is provided by way of illustration and not as a limitation. It is contemplated that any other equivalent aggregation approaches for considering probability are possible as well. One advantage of this representation is that previous data can be integrated with new data. If the probabilities are maintained, then as new data comes in and new probabilities are generated, they can be integrated with older probabilities, increasing confidence, avoiding outliers and integrating changes.

More specifically, to capture confidence in the models of the various embodiment described herein, the system 100 can change the latent representational encoding layer 207. In one embodiment, the latent representation is a tensor of numbers encoding the map. Instead, to incorporate confidence, the latent representation can be a distribution over map representations. One approach to determining the distribution includes but is not limited to the Reparameterization trick from the Variational Auto Encoder process. In this formulation, the encoder 203 generates the mean and covariances of a multivariate Gaussian, and then the decoder 107 gets a sampling from it. In training, a specialized loss function also tries to make the distribution as normalized as possible.

Having a latent representation as such makes it possible to encode uncertainty more explicitly. Areas or tiles with more uncertainty will have more variance. Also, this is a natural way to combine the results of multiple encoders or encoder outputs 113 on different data. The distributions of these different encoders can be combined to compensate for areas or tiles with more or less confidence, and also confidence can be aggregated using various statistical techniques, for example from Bayesian statistics. In other words, the encoding for each tile is associated with a probability that the encoding represents a true encoding for the each tile. Then the generating of the map representation by the machine learning decoder 107 is further based on the probability. Moreover, the latent representation described above can also be hierarchical such as ones similarly used in Variational Auto Encoders. This could allow the latent representation to speak to different resolutions and encode regularity at different scales.

In one embodiment, the digital map data of the geographic database 111 are not raster images. Rather, they are a composition of geometric entities in vector-based format. The process below describes embodiments for providing vector-based map representations as outputs from the system 100.

Figure 9:
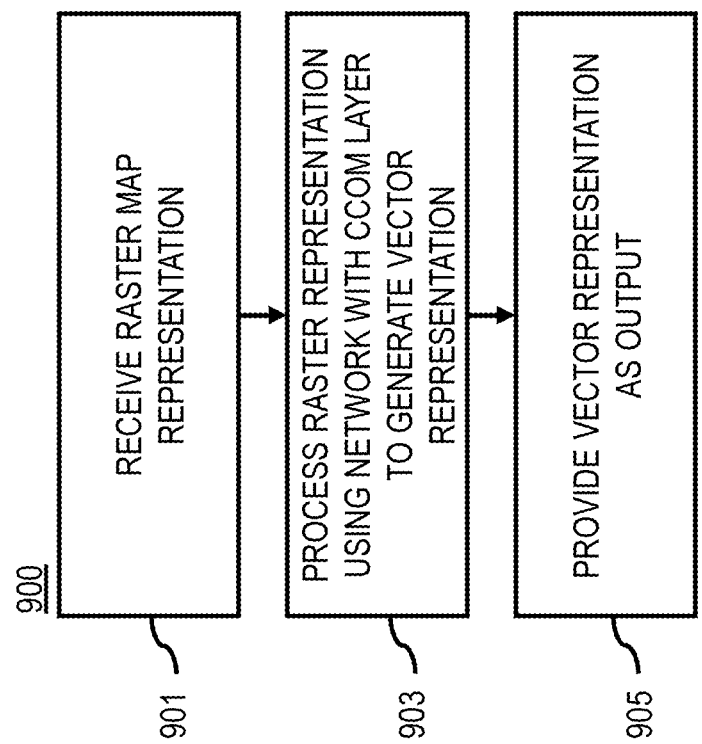
FIG. 9 is a flowchart of a process for generating a vector map representation, according to one example embodiment.

FIG. 9 is a flowchart of a process 900 for generating a vector map representation, according to one example embodiment. In various embodiments, the mapping platform 105 and/or any of its modules/components may perform one or more portions of the process 900 and may be implemented in, for instance, a chip set including a processor and a memory as shown in FIG. 14 or in circuitry. As such, the mapping platform 105 and/or any of its components/modules can provide means for accomplishing various parts of the process 900, as well as means for accomplishing embodiments of other processes described herein in conjunction with other components of the system 100. Although the process 900 is illustrated and described as a sequence of steps, it is contemplated that various embodiments of the process 900 may be performed in any order or combination and need not include all of the illustrated steps.

In step 901, the map generation module 403 receives a raster map representation generated, e.g., by the decoder 107 according to the various embodiments of the process 500 of FIG. 5. In other words, the process 900 builds on the raster map representation generated according to various embodiments of the process 500 of FIG. 5. Instead of mapping directly from noisy raw data directly to a vector map representation, the process 900 uses the output of the decoder 107 to generate a raster map, and then adds a network that takes the raster map and outputs a vector representation of the map.

In step 903, the map generation module 403 uses a separate neural network to process the raster representation to generate a vector representation of the output map. This neural network is built based at least in part on the feature of a movable window of the decoder 107 as described above. Rather than having the network output vectors over the entire image, the image is broken down into overlapping small squares and vectors are generated for them locally. In one embodiment, the system 100 introduces a new network layer referred to herein as a Convolutional Center of Mass (CCOM) layer.

The CCOM layer solves the problem of automatically converting a raster map representation comprising pixels to vector graphics which are parametric, e.g., draw a LINE from location <45, 60> to location <134, 23> expressed as <horizontal x location, vertical y location> in a vector image space. For the network to be successful it must map from a raster representation to a vector representation, e.g., pixels on or off to these parametric coordinates. In addition, they network has to achieve this mapping in a way that is also gradient friendly (e.g., amenable to back propagation via gradient descent to optimize the coefficients, weights, and biases of the network to make accurate predictions). That means that as gradients are propagated through the network for learning that these coordinates can move in a continuous manner. This presents a significant technical challenge that is solved using the CCOM layer.

In one embodiment, the CCOM layer is calculated according to the code illustrated in Table 1 below.

TABLE 1

```
import torch as th
import torch.nn.functional as F
def forward(self, img):
    s = img.shape
    # Generate the coordinate value for every location of x (the raster)
    grid_x, grid_y = th.meshgrid(th.arange(0, s[-2]), th.arange(0, s[-1]),
    indexing='xy')
    # generate the average weight of every kernel sized neighborhood
    denominator = F.avg_pool2d(img, kernel_size=self.kernel_size,
    stride=self.stride, padding=self.padding)
    denominator[denominator==0] = self.epsilon
    # calculate the center of mass for the x coordinate using the img weights
    at each kernel location
    x_numerator = F.avg_pool2d(th.mul(img, grid_x.expand_as(img)),
    kernel_size=self.kernel_size, stride=self.stride, padding=self.padding)
    # normalize the weights used in the center of mass calculation
    x_coords = th.div(x_numerator, denominator)
    # same for y
    y_numerator = F.avg_pool2d(th.mul(img, grid_y.expand_as(img)),
    kernel_size=self.kernel_size, stride=self.stride, padding=self.padding)
    y_coords = th.div(y_numerator, denominator)
    return (x_coords, y_coords, denominator
```

This CCOM layer or function then returns a coordinate for each kernel location (x and y) and also returns the weight (e.g., average weight or other statistical variation of the weight) at that location (denominator). The coordinate, for instance, corresponds to a feature of the raster representation (e.g., indicated by a pixel being on in the representation or being segmented to a map feature such as a road), and the weight represents an intensity of the feature (e.g., how many pixels of the feature is present) at each kernel location.

Figure 10:
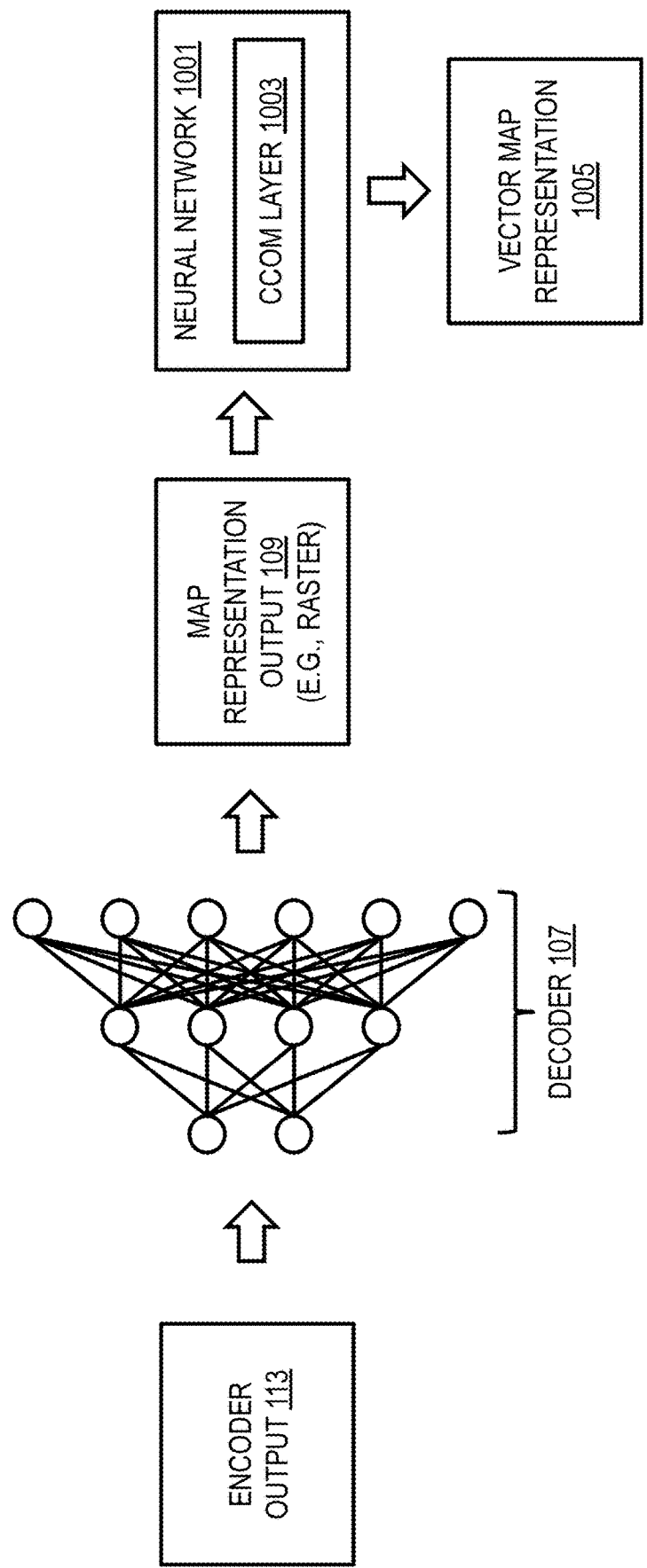
FIG. 10 is a diagram illustrating an example pipeline for generating a vector map representation, according to one example embodiment.

In one embodiment, to generate actual vector graphics using this CCOM layer, the approach illustrated in the processing pipeline of FIG. 10 is taken. In this case, the approach is described with respect to generating a polyline, but other shapes can be done similarly. As shown in FIG. 10, an encoder output 113 is processed by the decoder 107 to generate a map representation output 109 that is a raster map representation To convert the raster map representation to vector graphics, the raster image is fed through a series of processing layers of a neural network 1001 comprising at least one CCOM layer 1003. During the processing, a channel is allocated per local polyline path. This channel is broken up into local squares (or tiles or any other subdivision of the representation) and a poly line is generated for each square or tile. This is done by running the channel through the CCOM layer 1003, then a topK operation or equivalent is performed on the denominator, selecting k coordinates to be used in the polyline and giving an order to them. Table 2 below illustrates example code to perform the topK operation.

TABLE 2

```
for s in range(num_squares):
    for p in range(self.paths):
        topkvals, topkinds = th.topk(denominator[k,s,p,:], self.segments+1)
        points = th.t(th.stack((cord_x[k,s,p,topkinds],cord_y[k,s,p,topkinds]
        width = widths[k, s, p] #.cpu( )
        path = pydiffvg.Path(
        num_control_points=num_ctrl_pts, points=points,
        stroke_width=width, is_closed=False)
```

In the example code of Table 2, fragment k is the batch item index, s is the square or tile number, and p is the path number.

The CCOM layer 1003 addresses the technical challenges of automated raster map to vector map conversion as follows. First the CCOM layer 1003 enables the system 100 to translate directly from a raster to vector coordinates. Locations with active pixels are convolved with their coordinate location, weighted by intensity within a kernel location.

The second question is how a gradient can affect the pixel representation from the coordinate representation during training. In one embodiment, the gradient hits the CCOM layer 1003 in two directions from the coordinates and denominator. Through the coordinate layer it can "push" the weighting that makes a coordinate, causing it to shift the location within a single kernel location. But since the kernels are overlapping (e.g. stride=1) as the coordinate shifts to one side of the kernel, the adjoining kernel that shares weights with it can pick it up and shift the coordinate into it as well.

The other piece is the denominator on its own. As the denominator drives the choice of the topK points to use in a polyline (or other parametric shape) and their order. Being able to gradient through that during training is also useful in generating the polyline and organizing it.

In step 905, the output module 407 provides the vector representation of the map (e.g., vector map representation 1005) as an output. As with the raster output, the vector representation can be stored in the geographic database and/or provided for use or access by the vehicle 123 and/or UE 125 executing applications 127 as well as by the services platform 117, services 119, and/or content providers 121.

Figure 11:
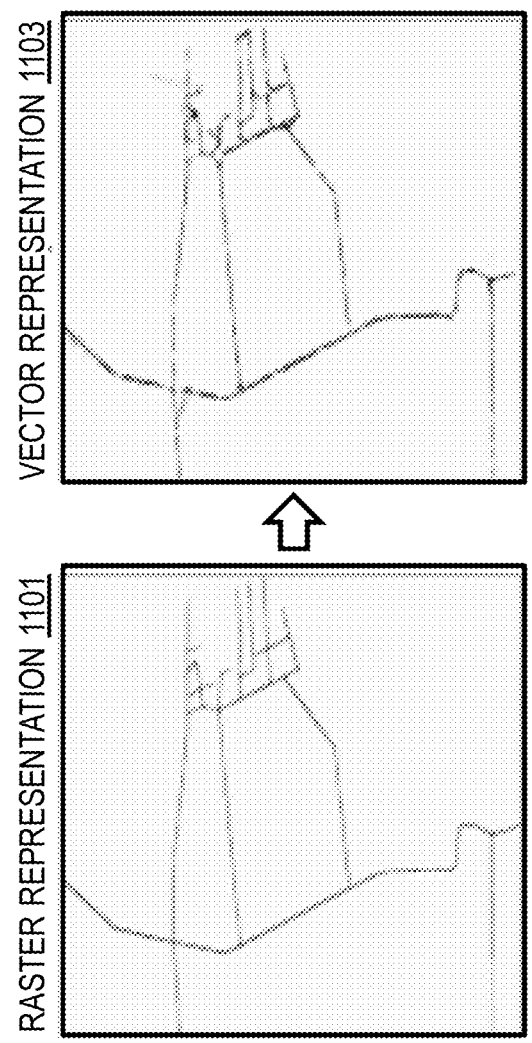
FIG. 11 is a diagram illustrating an example of a vector map representation output, according to one example embodiment.

FIG. 11 is a diagram illustrating an example of a vector map representation output, according to one example embodiment. In this example, a raster map representation 1101 is processed according the various embodiments of process 900 to generate the vector representation 1103. In one embodiment, the vector representation can be incorporated in the geographic database 111 which stores maps or road networks and other cartographic features in vector graphics based formats (e.g., a node-link representation of a road network). In this way, the system 100 can provide a complete end-to-end solution for generating maps from raw imagery for importing into the vector-based digital map data.

In summary, using ML for automated map generation is technically challenging, there are data and modeling challenges. The various embodiments of the system 100 focuses on the task of generating clean map outputs (e.g., via a decoder 107) independent of the specific inputs. This independent decoder approach can form a foundation for map building for different input types, as it will naturally interpret data in way consistent with map generation.

Returning to FIG. 1, as shown, the system includes the mapping platform 105 operating alone or in combination with the machine learning system 103 for providing machine learning-based map generation according to the various embodiments described herein. In one embodiment, the machine learning system 103 of the mapping platform 105 includes or is otherwise associated with one or more machine learning models 405 (e.g., neural networks or other equivalent network using algorithms such as but not limited to an evolutionary algorithm, reinforcement learning, GAN, or equivalent) for automated map generation.

In one embodiment, the mapping platform 105 has connectivity over the communication network 115 to the services platform 117 that provides one or more services 119 that can use map representation output 109 to perform one or more functions (e.g., mapping, navigation, etc.). By way of example, the services 119 may be third party services and include but is not limited to mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 119 uses map representation output 109, and/or other data generated by the mapping platform 105 to provide services 119 such as navigation, mapping, other location-based services, etc. to the vehicles 123, UEs 125, and/or applications 127 executing on the UEs 125.

In one embodiment, the mapping platform 105 may be a platform with multiple interconnected components. The mapping platform 105 may include multiple servers, intelligent networking devices, computing devices, components, and corresponding software for providing spatial aggregation for location-based services according to the various embodiments described herein. In addition, it is noted that the mapping platform 105 may be a separate entity of the system 100, a part of the one or more services 119, a part of the services platform 117, or included within components of the vehicles 123 and/or UEs 125.

In one embodiment, content providers 121 may provide content or data (e.g., image data 101, geographic data, etc.) to the geographic database 111, mapping platform 105, machine learning system 103, the services platform 117, the services 119, the vehicles 123, the UEs 125, and/or the applications 127 executing on the UEs 125. The content provided may be any type of content, such as machine learning models, map embeddings, map content, textual content, audio content, video content, image content, etc. In one embodiment, the content providers 121 may provide content that may aid in providing machine learning-based map generation according to the various embodiments described herein. In one embodiment, the content providers 121 may also store content associated with the mapping platform 105, machine learning system 103, geographic database 111, services platform 117, services 119, and/or any other component of the system 100. In another embodiment, the content providers 121 may manage access to a central repository of data, and offer a consistent, standard interface to data, such as a repository of the geographic database 111.

In one embodiment, the vehicles 123 and/or UEs 125 may execute software applications 127 to use or access map representation output 109 or data derived therefrom (e.g., digital map data or vector representations of the geographic database 111) according the embodiments described herein. By way of example, the applications 127 may also be any type of application that is executable on the vehicles 123 and/or UEs 125, such as autonomous driving applications, mapping applications, location-based service applications, navigation applications, device control applications, content provisioning services, camera/imaging application, media player applications, social networking applications, calendar applications, and the like. In one embodiment, the applications 127 may act as a client for the mapping platform 105 and perform one or more functions associated with providing spatial aggregation for location-based services alone or in combination with the mapping platform 105.

By way of example, the vehicles 123 and/or UEs 125 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 123 and/or UEs 125 can support any type of interface to the user (such as "wearable" circuitry, etc.). In one embodiment, the vehicles 123 and/or UEs 125 may be associated with or be a component of a vehicle or any other device.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 105, machine learning system 103, services platform 117, services 119, vehicles 123 and/or UEs 125, and/or content providers 121 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 12:
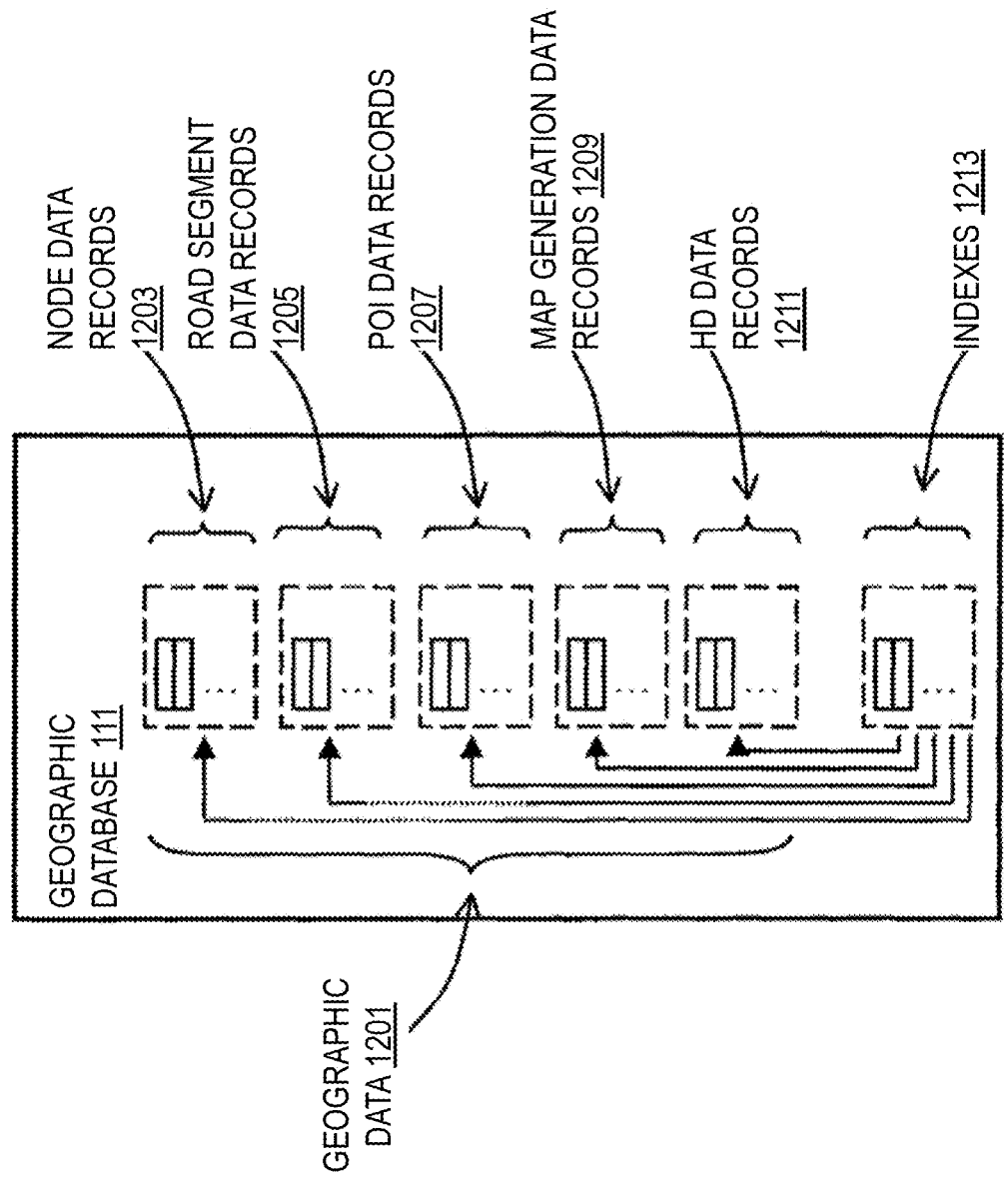
FIG. 12 is a diagram of a geographic database, according to one example embodiment.

FIG. 12 is a diagram of a geographic database, according to one embodiment. In one embodiment, the geographic database 111 includes geographic data 1201 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 1201. In one embodiment, the geographic database 111 include high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., HD data records 1211) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 1203, road segment or link data records 1205, POI data records 1207, map generation data records 1209, HD mapping data records 1211, and indexes 1213, for example. More, fewer, or different data records can be provided. In one embodiment, additional data records (not shown) can include cartographic ("carto") data records, routing data, and maneuver data. In one embodiment, the indexes 1213 may improve the speed of data retrieval operations in the geographic database 111. In one embodiment, the indexes 1213 may be used to quickly locate data without having to search every row in the geographic database 111 every time it is accessed. For example, in one embodiment, the indexes 1213 can be a spatial index of the polygon points associated with stored feature polygons.

In exemplary embodiments, the road segment data records 1205 are links or segments representing roads, streets, or paths, as can be used in the calculated route or recorded route information for determination of one or more personalized routes. The node data records 1203 are end points (for example, representing intersections or an end of a road) corresponding to the respective links or segments of the road segment data records 1205. The road link data records 1205 and the node data records 1203 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 1207. The geographic database 111 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city).

In one embodiment, the geographic database 111 can also include map generation data records 1209 for trained machine learning models, encoder outputs 113, image data 101, map representation output 109, raster/vector map representations, machine learning model parameters, and/or any other related data that is used or generated according to the embodiments described herein. By way of example, the ETA data records 1209 can be associated with one or more of the node records 1203, road segment records 1205, and/or POI data records 1207 to associate the ETA data with specific places, POIs, geographic areas, and/or other map features. In this way, the ETA data records 1209 can also be associated with the characteristics or metadata of the corresponding records 1203, 1205, and/or 1207.

In one embodiment, as discussed above, the HD mapping data records 1211 model road surfaces and other map features to centimeter-level or better accuracy. The HD mapping data records 1211 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1211 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 1211 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1211.

In one embodiment, the HD mapping data records 1211 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 121 in association with the services platform 117 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicles 123 and/or UEs 125. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing machine learning-based map generation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 13:
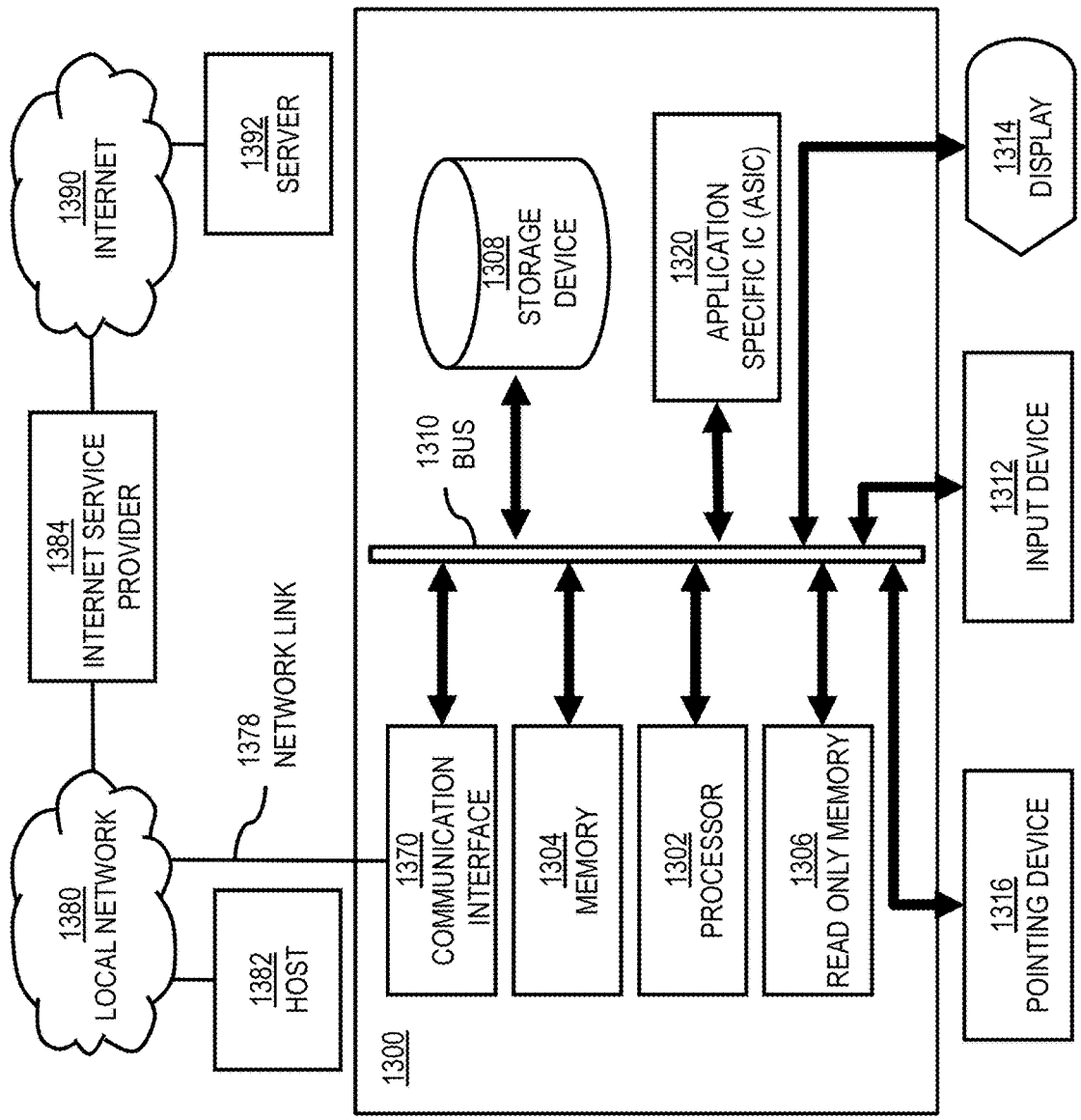
FIG. 13 is a diagram of hardware that can be used to implement an example embodiment of the processes described herein.

FIG. 13 illustrates a computer system 1300 upon which an embodiment of the invention may be implemented. Computer system 1300 is programmed (e.g., via computer program code or instructions) to provide machine learning-based map generation as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to providing machine learning-based map generation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for providing machine learning-based map generation. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for providing machine learning-based map generation, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 115 for providing machine learning-based map generation.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system can be deployed in various configurations within other computer systems, e.g., host 1382 and server 1392.

FIG. 14 illustrates a chip set 1400 upon which an embodiment of the invention may be implemented. Chip set 1400 is programmed to provide machine learning-based map generation as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide machine learning-based map generation. The memory 1405 also stores the data associated with or generated by the execution of the inventive steps.

Figure 15:
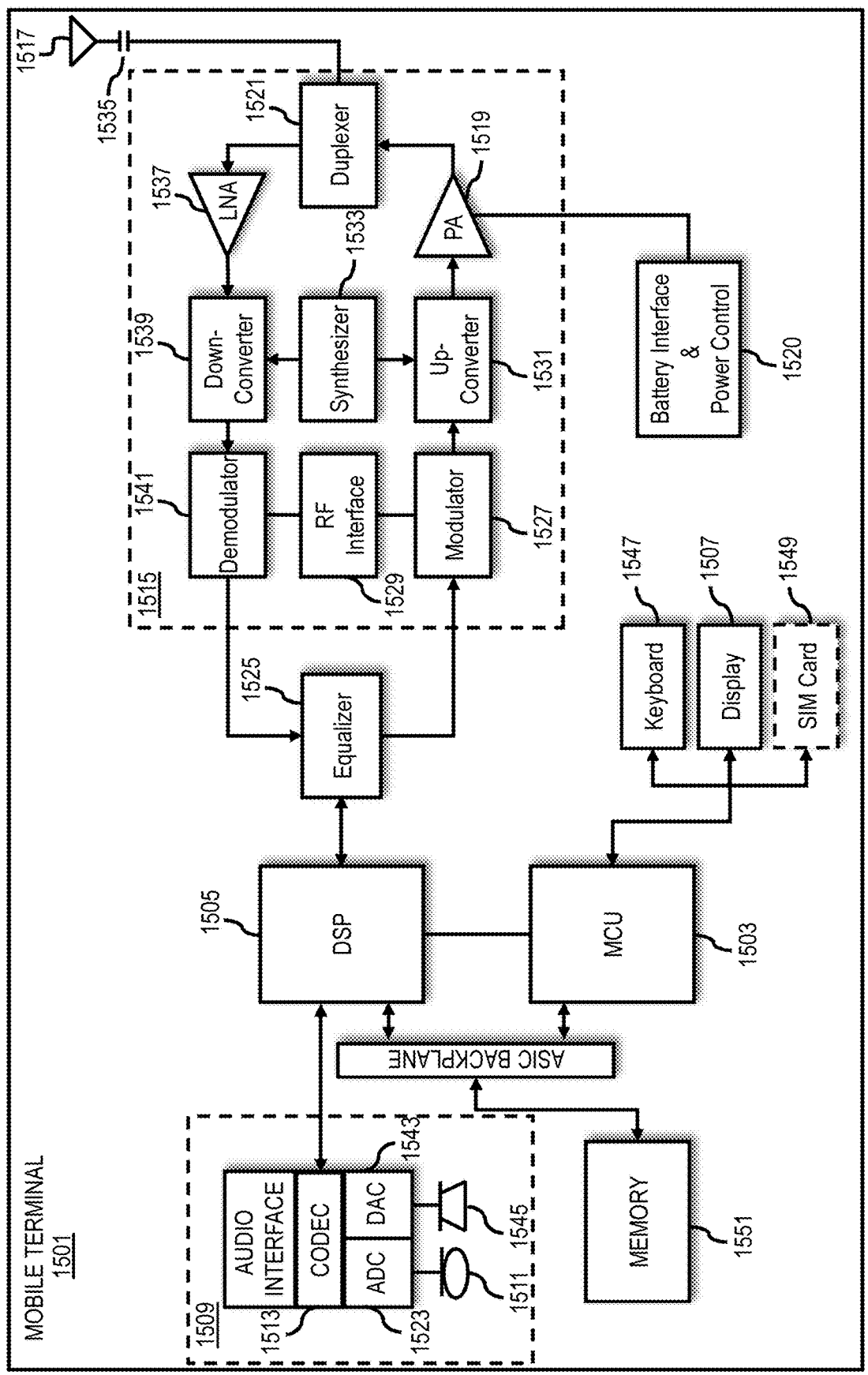
FIG. 15 is a diagram of a terminal that can be used to implement an example embodiment of the processes described herein.

FIG. 15 is a diagram of exemplary components of a mobile terminal 1501 (e.g., vehicle 123, UE 125, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to provide machine learning-based map generation. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of machine learning-based map generation comprising:

receiving an encoder output for an image depicting a geographic area, wherein the encoder output comprises an encoding for each tile of a plurality of tiles of the image, and wherein the encoding represents data associated with a location of each tile;

using a machine learning decoder to determine a window over the encoder output comprising a tile of the plurality of tiles and one or more neighboring tiles and to process the encoding associated with the tile and the one or more neighboring tiles in the window to generate a map representation for the location of the tile; and providing the map representation as an output.

2. The method of claim 1, further comprising:

using the machine learning decoder to move the window to another tile of the plurality of tiles, wherein the moved window is over the another tile and one or more other neighboring tiles, and to process the encoding associated with the another tile and the one or more other neighboring tiles in the moved window to generate another map representation for the another tile.

3. The method of claim 1, wherein the one or more neighboring tiles are immediate neighbors to the tile.

4. The method of claim 1, further comprising:

determining the one or more neighboring tiles based on one or more cartographic relationships to the tile.

5. The method of claim 1, wherein the encoding for each tile is associated with a probability that the encoding represents a true encoding for the each tile, and wherein the generating of the map representation by the machine learning decoder is further based on the probability.

6. The method of claim 1, wherein the encoding for each tile is based on an encoding codebook.

7. The method of claim 1, wherein the machine learning decoder is extracted from a trained encoder-decoder stack and used independently from a machine learning encoder of the encoder-decoder stack.

8. The method of claim 1, wherein a hidden layer between the machine learning encoder and the machine learning decoder of the encoder-decoder stack is used as the representational layer of the encoding.

9. The method of claim 1, wherein the map representation is a raster representation.

10. The method of claim 9, further comprising:

processing the raster representation using a neural network comprising at least one convolutional center of mass (CCOM) layer to generate a vector representation.

11. The method of claim 10, wherein the CCOM layer is a function that returns a coordinate for each kernel location corresponding to a feature of the raster representation and a weight at the coordinate, and wherein the weight represents an intensity of the feature at each kernel location.

12. The method of claim 9, wherein each kernel of the CCOM layer overlaps.

13. The method of claim 1, wherein the machine learning decoder comprises one or more convolutional layers that upscale the encoder output to a target image resolution.

14. An apparatus for machine learning-based map generation comprising:

at least one processor; and at least one memory including computer program code for one or more programs, the at least one memory and the computer program code configured to, with the at least one processor, cause the apparatus to perform at least the following:

receive an encoder output for an image depicting a geographic area, wherein the encoder output comprises an encoding for each tile of a plurality of tiles of the image, and wherein the encoding represents data associated with a location of each tile;

use a machine learning decoder to determine a window over the encoder output comprising a tile of the plurality of tiles and one or more neighboring tiles and to process the encoding associated with the tile and the one or more neighboring tiles in the window to generate a map representation for the location of the tile; and provide the map representation as an output.

15. The apparatus of claim 14, wherein the apparatus is further caused to:

use the machine learning decoder to move the window to another tile of the plurality of tiles, wherein the moved window is over the another tile and one or more other neighboring tiles and to process the encoding associated with the another tile and the one or more other neighboring tiles in the moved window to generate another map representation for the another tile.

16. The apparatus of claim 14, wherein the map representation is a raster representation, and wherein the apparatus is further caused to:

processing the raster representation using a neural network comprising at least one convolutional center of mass (CCOM) layer to generate a vector representation.

17. The apparatus of claim 16, wherein the CCOM layer is a function that returns a coordinate for each kernel location corresponding to a feature of the raster representation and a weight at the coordinate, and wherein the weight represents an intensity of the feature at each kernel location.

18. A non-transitory computer-readable storage medium for machine learning-based map generation, carrying one or more sequences of one or more instructions which, when executed by one or more processors, cause an apparatus to at least perform the following steps:

receiving an encoder output for an image depicting a geographic area, wherein the encoder output comprises an encoding for each tile of a plurality of tiles of the image, and wherein the encoding represents data associated with a location of each tile;

using a machine learning decoder to determine a window over the encoder output comprising a tile of the plurality of tiles and one or more neighboring tiles and to process the encoding associated with the tile and the one or more neighboring tiles in the window to generate a map representation for the location of the tile; and providing the map representation as an output.

19. The non-transitory computer-readable storage medium of claim 18, wherein the apparatus is caused to further perform:

using the machine learning decoder to move the window to another tile of the plurality of tiles, wherein the moved window is over the another tile and one or more other neighboring tiles and to process the encoding associated with the another tile and the one or more other neighboring tiles in the moved window to generate another map representation for the another tile.

20. The non-transitory computer-readable storage medium of claim 18, wherein the map representation is a raster representation, and wherein the apparatus is caused to further perform:
  processing the raster representation using a neural network comprising at least one convolutional center of mass (CCOM) layer to generate a vector representation,
  wherein the CCOM layer is a function that returns a coordinate for each kernel location corresponding to a feature of the raster representation and a weight at the coordinate, and wherein the weight represents an intensity of the feature at each kernel location.

* * * * *